US012584688B2

(12) United States Patent
Sheley

(10) Patent No.: US 12,584,688 B2
(45) **Date of Patent: *Mar. 24, 2026**

(54) GRAIN DRYER WITH DIRECTIONAL CONTAINMENT BAFFLES

(71) Applicant: The GSI Group, LLC, Assumption, IL (US)

(72) Inventor: Randall E. Sheley, Assumption, IL (US)

(73) Assignee: The GSI Group, LLC, Assumption, IL (US)

( * ) Notice: Subject to any disclaimer, the term of this patent is extended or adjusted under 35 U.S.C. 154(b) by 853 days.

This patent is subject to a terminal disclaimer.

(21) Appl. No.: 17/930,876

(22) Filed: Sep. 9, 2022

(65) Prior Publication Data

US 2023/0097343 A1 Mar. 30, 2023

Related U.S. Application Data

(60) Provisional application No. 63/261,903, filed on Sep. 30, 2021.

(51) Int. Cl.
*F26B 17/12* (2006.01)
*F26B 21/10* (2006.01)
*F26B 23/00* (2006.01)

(52) U.S. Cl.
CPC ............ *F26B 17/126* (2013.01); *F26B 21/10* (2013.01); *F26B 23/007* (2013.01); *F26B 2200/06* (2013.01)

(58) Field of Classification Search
CPC ...... F26B 17/126; F26B 21/10; F26B 23/007; F26B 2200/06

(Continued)

(56) References Cited

U.S. PATENT DOCUMENTS 1,829,741 A 11/1931 De Vries
5,806,204 A * 9/1998 Hoffman ................ D06F 58/24
34/605

(Continued)

FOREIGN PATENT DOCUMENTS

CA 2901070 A1 * 2/2016
GB 675308 A 7/1952

(Continued)

OTHER PUBLICATIONS

UK Intellectual Property Office, Search report for related UK Application No. GB2114456.3, dated Mar. 11, 2022.

*Primary Examiner* — Stephen M Gravini
(74) *Attorney, Agent, or Firm* — Ray Quinney & Nebeker; Daniel J. Bezdjian

(57) ABSTRACT

A grain dryer has an upper plenum in communication with a pair of heating columns. Each heating column has an inner boundary and an outer boundary being formed with a plurality of angled containment baffles configured to funnel grain down the heating column while allowing heated air to be drawn from the upper plenum through the grain. At least one fan takes a suction from the ductwork to draw heated air from the upper plenum through the heating column such that grain is exposed to heated air. The orientation of the containment baffles forming the inner boundary directs the flow of the heated air in a downward direction through an inner portion of a grain column between the inner boundary and the outer boundary, and the orientation of the containment baffles forming the outer boundary directs the heated air in an upwards direction in an outer portion of the grain column.

16 Claims, 7 Drawing Sheets

(58) Field of Classification Search
USPC .......................................................... 34/168
See application file for complete search history.

(56) References Cited

U.S. PATENT DOCUMENTS

| | | | | |
|---|---|---|---|---|
| 8,051,637 | B2 * | 11/2011 | Labrador | F03G 7/00 60/39.01 |
| 9,221,027 | B2 * | 12/2015 | Kuppler | B01J 10/005 |
| 9,506,693 | B2 * | 11/2016 | Pauling | F26B 17/14 |
| 10,668,443 | B2 * | 6/2020 | Kuppler | F27B 1/00 |
| 10,767,926 | B2 * | 9/2020 | Heilskov | F26B 23/007 |
| 11,193,711 | B2 * | 12/2021 | Heilskov | F26B 17/1425 |
| 11,378,335 | B2 * | 7/2022 | Morrison | F26B 23/007 |
| 12,188,721 | B2 * | 1/2025 | Jolly | F26B 21/12 |
| 12,392,552 | B2 * | 8/2025 | Kim | F26B 9/06 |
| 2006/0123655 | A1 | 6/2006 | Valfiorani | |
| 2015/0260455 | A1 * | 9/2015 | Lallouet | F26B 17/14 34/82 |
| 2023/0097343 | A1 * | 3/2023 | Sheley | F26B 23/007 34/168 |
| 2025/0109906 | A1 * | 4/2025 | Sheley | F26B 17/126 |

FOREIGN PATENT DOCUMENTS

| | | | | |
|---|---|---|---|---|
| GB | 2199644 A | | 7/1988 | |
| WO | WO-2006078315 A1 | * | 7/2006 | F02C 1/05 |

* cited by examiner

GRAIN DRYER WITH DIRECTIONAL CONTAINMENT BAFFLES

CROSS REFERENCE TO RELATED APPLICATION

This application claims the benefit of U.S. Provisional Application No. 63/261,903, filed Sep. 30, 2021, which is hereby incorporated by reference in its entirety.

BACKGROUND OF THE INVENTION

Field of Invention

This invention relates generally to agricultural dryers, and more particularly to mixed-flow grain dryer having a vacuum heat recovery system.

Description of Related Art

Grains such as wheat, corn, soybean, and other agricultural products such as nuts, often need to be dried after harvesting to achieve a moisture content adequate for inhibiting microbial growth during storage and preserve the value of the stored product. Agricultural dryers most commonly referred to as grain dryers, allow farmers to start harvesting earlier at higher moisture levels and dry the products in bins to a more optimal moisture content, increasing yields and improving profits. This allows the farmer to minimize weather risks, reduce dry matter loses, and reduce head shatter loss. Drying typically involves the reduction of moisture from about 17-30% w/w to values between 8 and 15% w/w, depending on the product involved.

Drying the product includes directing an air flow through a heater to heat the air and then directing the heated airflow through the product storage bin. Various methods of drying grain are well-known in the art. Cross-flow dryers provide airflow in a direction perpendicular to the flow of the grain. Many cross-flow dryers utilize perforated screens to hold the grain in columns while allowing air to pass through the grain. However, the exhaust-side screens can become plugged resulting in the necessity for frequent cleanings. Cross-flow dryers can also result in an uneven temperature distribution of grain across the column.

It is also known to use heat from the grain as it is cooled to preheat the air to be directed through the columns. Commonly assigned U.S. Pat. No. 11,378,335 entitled "Vacuum Cooled Grain Dryer" discloses a grain dryer that has adjustable bypass air inlets leading to a cooling section of the dryer. However, heated air currents in the dryer often result in uneven and inconsistent grain drying, with grain first encountering the heated air tending to dry faster than grain encountering heated air that has already passed through a quantity of grain transferred and thus having lost some of its heating capacity. This uneven and inconsistent heated airflow results in capacity and efficiency deficiencies in modern grain dryers.

BRIEF SUMMARY

In one aspect, the invention is directed to a grain dryer for heating and drying grain. The grain dryer includes a receiving area having an inlet port to receive grain entering the dryer and a heated drying section comprising a pair of heating columns with an upper plenum in communication with the pair of heating columns. Each heating column has an inner boundary and an outer boundary, the inner boundary and outer boundary of each heating column being formed with a plurality of angled containment baffles configured to funnel grain down the heating column while allowing heated air to be drawn from the upper plenum through the grain. The grain dryer has a heater, wherein air is heated by the heater as the air is being pulled into the upper plenum, and a ductwork connected to the outer boundary of each heating column, wherein the ductwork adjacent each heating column comprises a plurality of vertical sections arranged along a length of the grain dryer from a forward end to a rearward end of the grain dryer. The grain dryer has at least one fan that takes a suction from the ductwork to draw heated air from the upper plenum through the heating column such that grain entering the grain dryer through inlet port flows from the receiving area into the heating columns where the grain is exposed to heated air being pulled from the upper plenum through the heating column and into the ductwork. The orientation of the containment baffles forming the inner boundary directs the flow of the heated air in a generally downward direction through an inner portion of a grain column between the inner boundary and the outer boundary, and the orientation of the containment baffles forming the outer boundary directs the heated air in a generally upwards direction in an outer portion of the grain column.

These and other features and advantages of this invention are described in, or are apparent from, the following detailed description of various exemplary embodiments of the systems and methods according to this invention.

BRIEF DESCRIPTION OF THE SEVERAL VIEWS OF THE DRAWINGS

The above mentioned and other features of this invention will become more apparent and the invention itself will be better understood by reference to the following description of embodiments of the invention taken in conjunction with the accompanying drawings, wherein.

and

Figure 1:
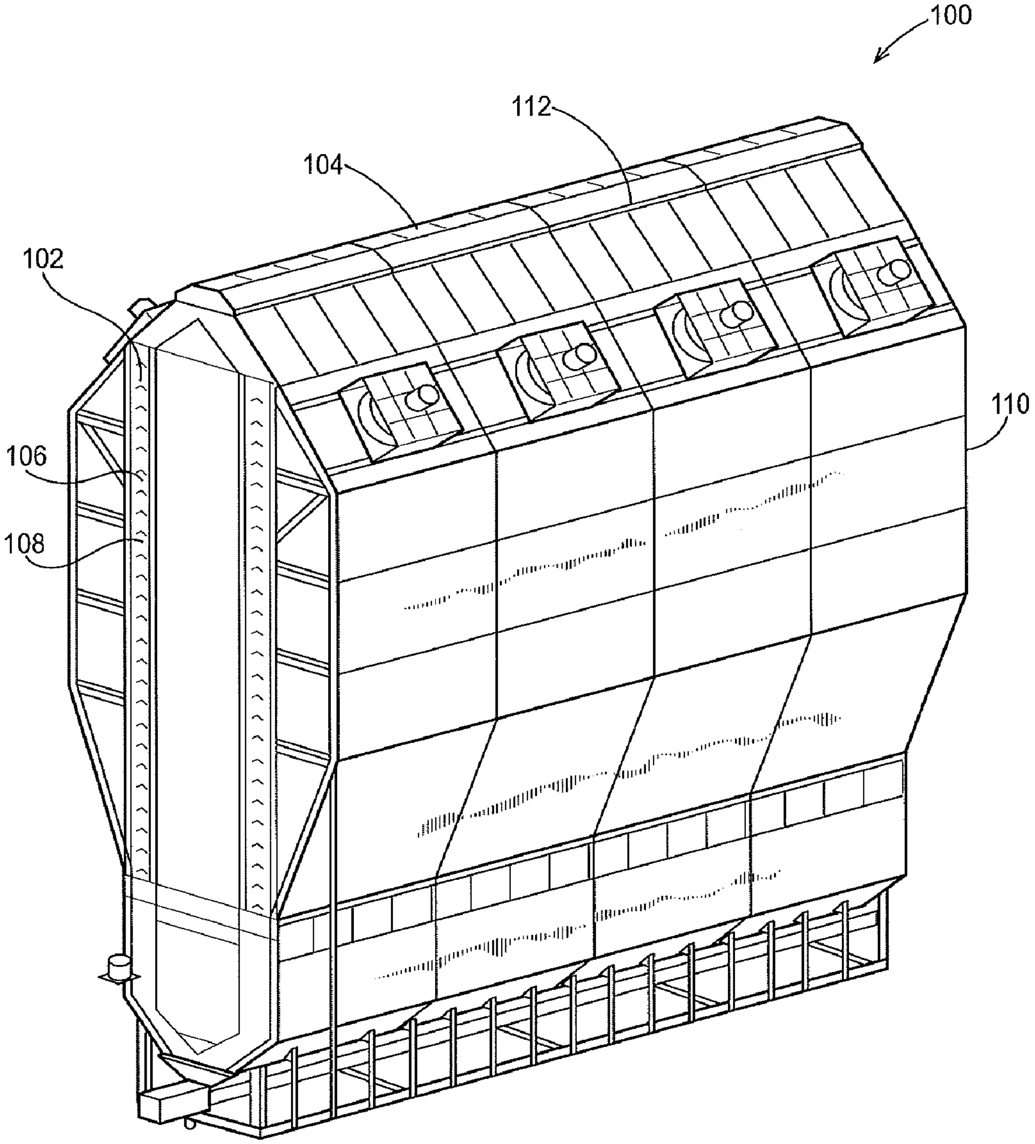
FIG. 1 is a perspective view of a grain dryer.
Figure 7:
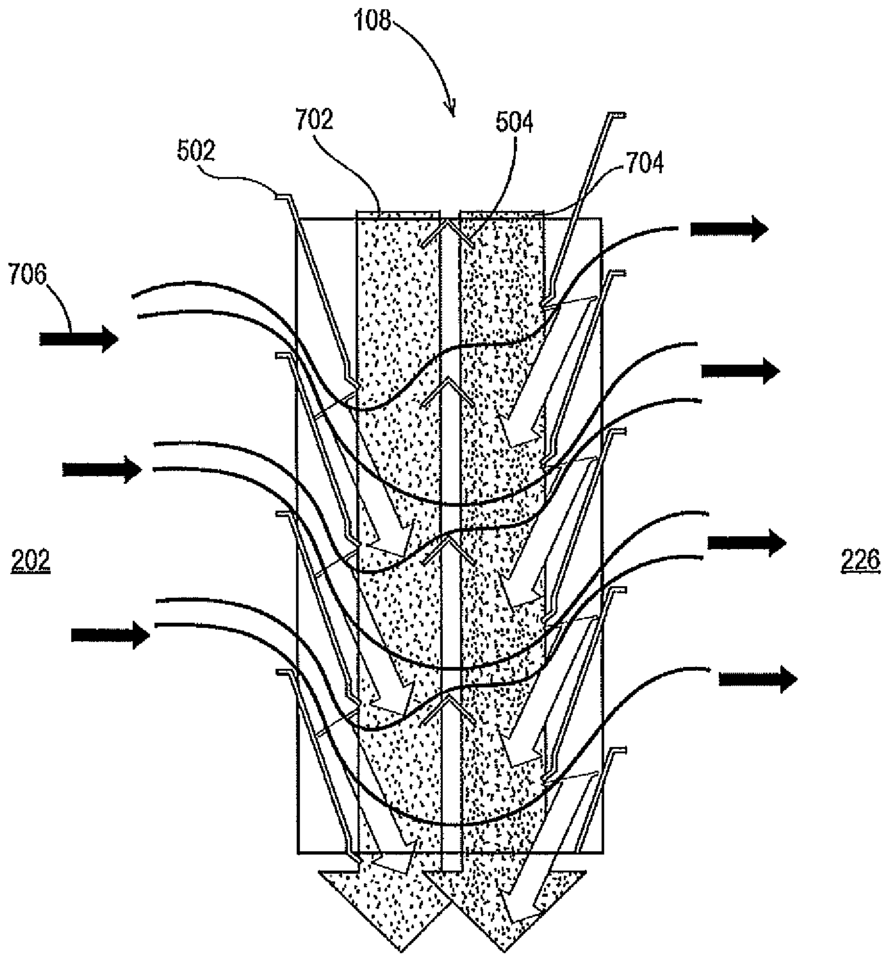

FIG. 7 is a schematic view of a portion of a heating column of the grain dryer of FIG. 1 showing an airflow passage of heated air.

Corresponding reference characters indicate corresponding parts throughout the several views of the drawings.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, configurations and equivalents as will become apparent from consideration of the following detailed description.

Figure 2:
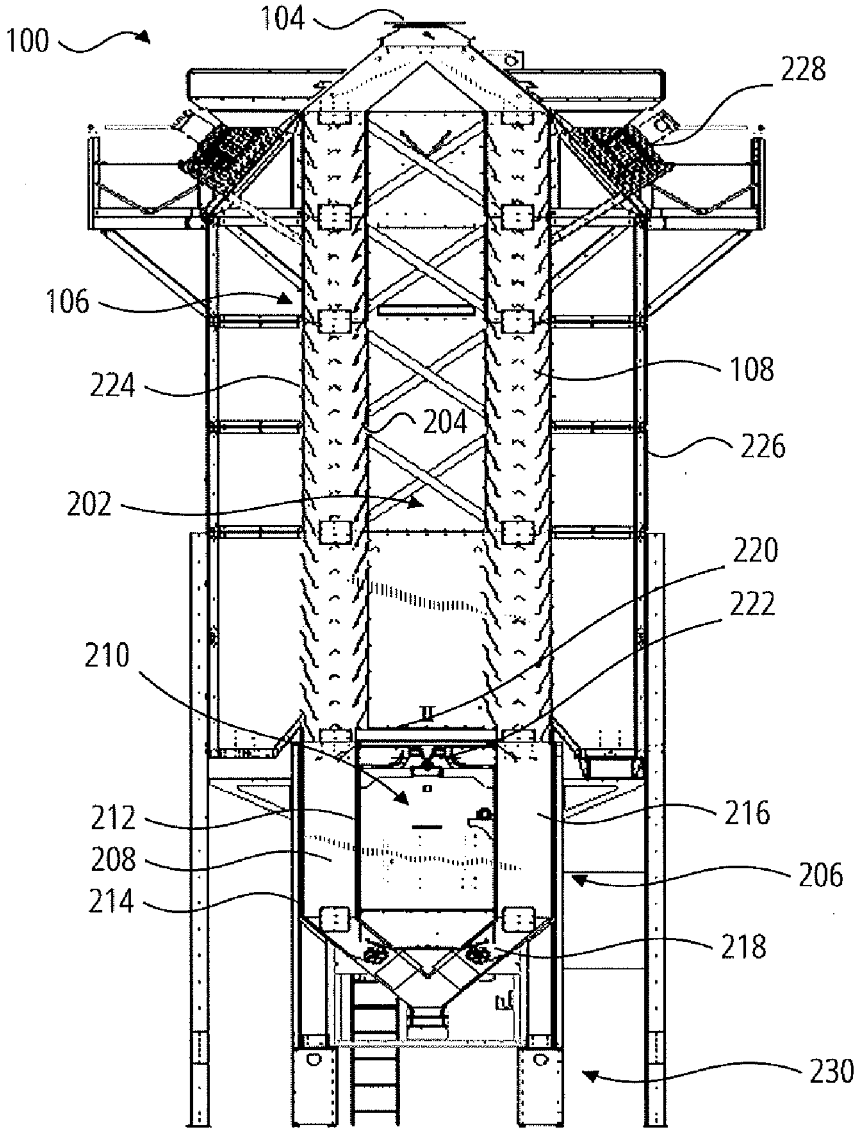
FIG. 2 is a sectional view of the grain dryer of FIG. 1.

Referring now to FIGS. 1 and 2, an example grain dryer 100 configured to dry grain has a wet hold section 102 that acts as a receiving area for grain entering the grain dryer 100 through an inlet port 104. The wet hold section 102 is in communication with and distributes grain to a heated drying section 106. Desirably, the heated drying section 106 is formed having a pair of separated heating columns 108.

In one embodiment, the heating columns 108 are made up of a number of horizontal levels 110. Additionally, the grain dryer 100 has a length between a forward end and an opposing rearward end which is divided into a number of vertical sections 112. One skilled in the art will understand that the capacity of the grain dryer 100 may be increased by including additional horizontal levels 110 or vertical sections 112 to increase the height or the length of the grain dryer 100 based on the needs of the facility where the grain dryer is to be installed. Desirably, horizontal levels 110 and vertical sections 112 can be added in somewhat of a modular arrangement to facilitate the manufacture and installation of the grain dryer 100.

As perhaps best seen in FIG. 2, between the heating columns 108 is an upper plenum 202. Each heating column 108 has an inner boundary 204 and an outer boundary 224 configured to direct the grain column in a downward direction. Beneath and in communication with each of the heating columns 108 of the heated drying section 106 is a cooling section 206 having a pair of cooling columns 208. Between the cooling columns 208 is a lower plenum 210. Each cooling column 208 comprises an inner wall 212 and an outer wall 214. Each illustrated cooling column 208 has a vertical upper portion 216 and a sloped lower portion 218. Desirably the vertical upper portion 216 has a height of between about 2 feet (0.6 m) and about 5 feet (1.5 m), and in one embodiment about 4 feet (1.2 m). In one embodiment, the heated drying section 106 of the grain dryer 100 represents about 70% of the grain holding capacity of the grain dryer, and the cooling section 206 represent about 30% of the grain holding capacity of the grain dryer.

A barrier 220 is located between the lower plenum 210 and the upper plenum 202. Mounted on the barrier 220 is a heater 222. Air in the lower plenum 210 is directed through the heater 222 and into the upper plenum 202 as will be described below.

In the illustrated embodiment, the outer boundary 224 of each heating column 108 is encased in a duct work 226. Air is drawn from the upper plenum 202 into the heating column 108 through the inner boundary 204 and then out through the outer boundary 224 into the duct work 226 by at least one fan 228. In one embodiment, the duct work 226 on each side of the grain dryer 100 is also configured in vertical sections 112 corresponding with its respective adjacent heating column 108. In one embodiment shown, to facilitate even air flow across the grain dryer 100, the grain dryer is generally symmetrical along a vertically extending plane P that runs through the center of the grain dryer between its opposing forward end and rearward end.

In operation, grain enters the grain dryer 100 through the inlet port 104 and into the wet hold section 102. From the wet hold section 102, grain flows downward through the heated drying section 106 where it is exposed to heated air in the heating columns 108. The grain flows down the heating columns 108 and is directed to the cooling columns 208 in the cooling section 206. From the cooling section 206, grain flows to an unloading section 230. In communication with the unloading section 230 is a suitable conveying mechanism (not shown) known in the art such as an auger, drag conveyor, belt conveyor or the like, to convey the grain as would be understood by one skilled in the art.

In the illustrated embodiment, each vertical section 112 of the duct work 226 has its own fan 228 located adjacent the uppermost horizontal level 110 of the heating column 108. The fans 228 along the length of the duct work 226 create a negative pressure within the duct work 226 compared to the pressure outside the grain dryer 100, thereby drawing a vacuum within the upper plenum 202 and lower plenum 210. In one embodiment, having each vertical section 112 have its own fan 228 has been found to distribute the airflow more evenly through the top of the duct work 226 so as to aid in airflow distribution through the heating columns 108, which helps provide improved dryer capacity, dryer fuel efficiency and dried grain quality. In one embodiment the fans 228 are plug style centrifugal fans, which are known in the art and need not be described in further detail herein. Alternately, the fans 228 may be axial fans or other known fans.

Outside or ambient air flows through the perforated outer wall 214 and through the grain to the perforated inner wall 212 of cooling columns 208 where the air enters the lower plenum 210 due to the negative pressure created by fans 228. As the ambient air flows through the grain column within the cooling column 208, the air is pre-heated while cooling the grain. The pre-heated air received within the lower plenum 210 through the cooling columns 208 is pulled into and further heated by the heater 222, before entering the upper plenum 202. Because air entering the lower plenum 210 is heated by coming in contact with the grain in the cooling column 208, less energy is needed for the heater 222 to heat the air to an appropriate drying temperature within the upper plenum 202.

The heated air then flows from the upper plenum 202 through the heating columns 108 to heat and dry the grain in the heated drying section 106. The air continues to be pulled from the heating columns 108 through the duct work 226, where it is drawn into the fans 228.

Figure 3:
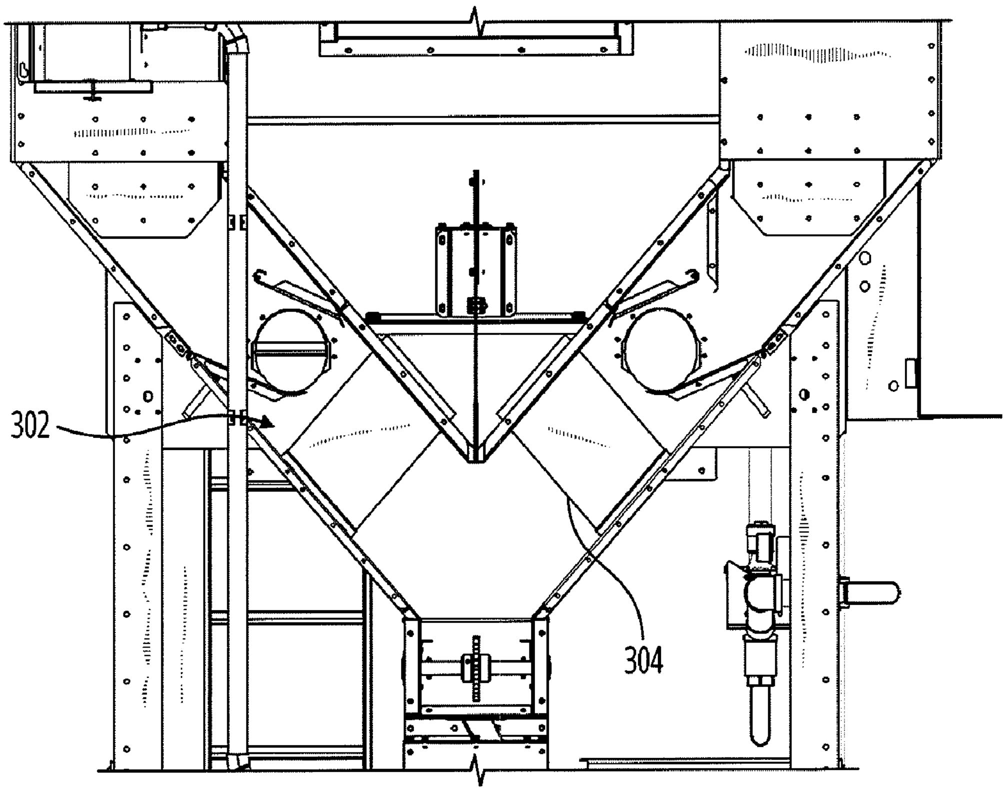
FIG. 3 is an enlarged sectional view of a portion of the grain dryer of FIG. 1.

Turning also now to FIG. 3, some air enters the upper plenum 202 through a cooling air bypass system 302. The cooling air bypass system 302 includes a series of bypass tubes 304 that bring bypass air into the lower plenum 210 from outside the grain dryer 100 without having the bypass air come into contact with the grain being cooled in the cooling section 206. The bypass tubes 304 desirably intersect the cooling columns 208 of the cooling section 206 generally perpendicularly, allowing the bypass air to pass through cooling column 208 without coming into contact with the grain and to flow directly into the lower plenum 210.

Figure 4:
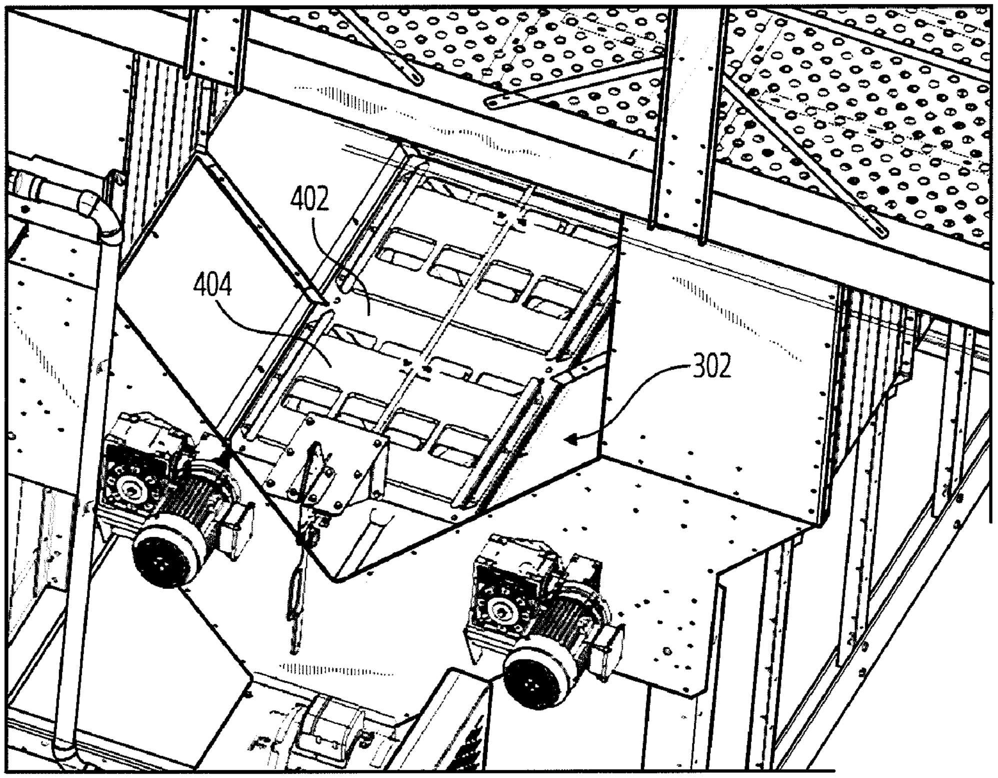
FIG. 4 is a cutaway perspective view of a portion of the grain dryer of FIG. 1

As best seen in FIG. 4, a grill 402 with an adjustable damper 404 is installed at a distal end of the bypass tubes 304 to allow for adjustment of the amount of bypass air that flows through the bypass tubes 304 and into the lower plenum 210. Desirably, the bypass tubes 304 of the cooling air bypass system 302 are distributed evenly across the length of the grain dryer 100 such that each vertical section 112 has at least one bypass tube to provide more uniform airflow distribution in the lower plenum 210 and upper plenum 202, resulting in improved capacity, fuel efficiency and grain quality. Adjusting the volume of bypass air brought into the lower plenum 210 helps balance the drying/cooling process and allows an addition means of controlling the temperature of grain exiting the grain dryer 100. In some embodiments, between about 50% and about 80% of the air entering the lower plenum 210 will enter through the cooling air bypass system 302 of the grain dryer 100.

Figure 5:
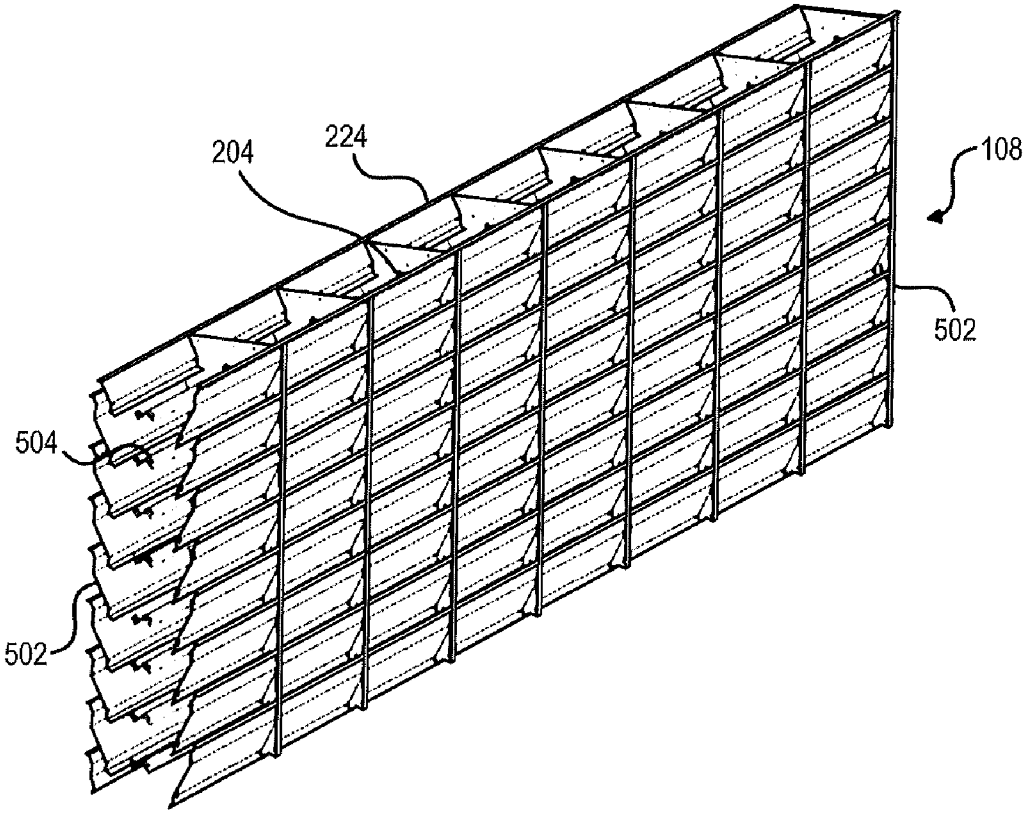
FIG. 5 is a perspective view of a heating column of the grain dryer of FIG. 1
Figure 6:
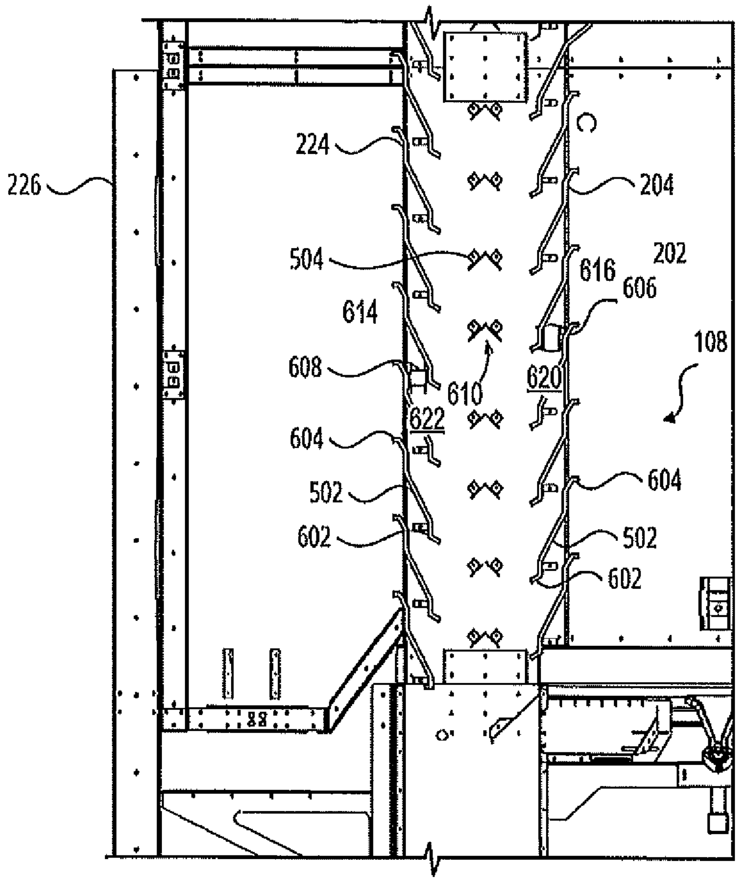
FIG. 6 is an enlarged sectional view of a portion of the grain dryer of FIG. 1.

Turning also now to FIGS. 5 and 6, the inner boundary 204 and outer boundary 224 of each heating column 108 are formed with a plurality of angled containment baffles 502 configured to funnel grain down the heating column 108 while allowing heated air to be drawn from the upper plenum 202 through the grain and into the duct work 226. The containment baffles 502 forming both the inner boundary 204 and the outer boundary 224 are arranged side-t0-side such that there are substantially continuous rows from the forward end of the grain dryer 100 to the rearward end as perhaps best seen in FIG. 6. A plurality of rows of the containment baffles 502 are arranged in a stacked formation substantially the entire height of the heating column 108 to continually direct the grain column in a downward manner through the heated drying section 106. The number of containment baffles 502 in each row can depend on desired length of each individual containment baffle 502 and the number of vertical sections 112 in the grain dryer 100, and the number of rows can depend on the desired height of each individual containment baffle 502 and the number of horizontal levels 110 in the grain dryer 100. The Containment baffles 502 are desirably made of a sheet metal formed into a desired shape that allows for proper installation and funneling action using sound engineering judgment.

The containment baffles 502 forming the inner boundary 204 are angled in a downward and inward direction such that upper ends 604 are closer to the upper plenum 202 and lower ends 602 are closer to the central portion of the heating column 108. The containment baffles 502 forming the outer boundary 224 are angled in a downward and inward direction such that upper ends 604 are closer to the duct work 226 and lower ends 602 are closer to the central portion of the heating column 108. Containment baffles 502 are arranged such that there is a vertical overlap 606 between the upper ends 604 of the containment baffles 502 in one row with the lower ends 602 of the containment baffles 502 in the row above. Containment baffles 502 are also arranged such that there is a horizontal space 608 between the upper ends 604 of the containment baffles 502 in one row with the lower ends 602 of the containment baffles 502 in the row above.

The heating column 108 has a plurality of grain diverters 504 mounted longitudinally at regular height intervals through the center of the grain column between the containment baffles 502 forming the inner boundary 204 and the containment baffles 502 forming the outer boundary 224. In the illustrated embodiment, there is one grain diverter 504 for each row of containment baffles 502. However, there may be one grain diverter 504 for a group of adjacent rows of containment baffles 502, or there may be more than one grain diverter 504 for each row of containment baffles 502.

Each grain diverter 504 is shaped to form a downward facing nook 610 that desirably forms a void in the grain column as the grain flows down the heating column 108. In one embodiment, the grain diverter 504 is formed of sheet metal bent with a first leg 614 and a second leg 616 and a peaked junction 618. It has been found that the nook 610 allow a void to form in the grain column, which causes the grain to flow more uniformly down through heating column 108 without having grain back up and flow back upwards between adjacent rows of containment baffles 502 through the horizontal space 608 and out of the heating column 108.

As the heated air from the upper plenum 202 flows through the heating column 108, it transfers energy to the grain column as it heats and dries the grain. It is noted that grain in an inner portion 702 of the grain column on the side closest to the inner boundary 204 receives initial contact with the heated air and tends to dry more quickly than grain in an outer portion 704 of the grain column, because by the time the heated air reaches the outer portion 704, the heated air has already transferred some of its energy to the grain in the inner portion 702. This has previously caused uneven drying across the grain column. As illustrated in FIG. 7, the orientation of the containment baffles 502 forming the inner boundary 204 directs the flow of the heated air, as shown by first arrows 706, in a generally downward direction through the inner portion 702, and the orientation of the containment baffles 502 forming the outer boundary 224 directs the heated air in a generally upwards direction in the outer portion 704. Thus, the desired arrangement of the containment baffles 502 and grain diverters 504 influences the direction of the airflow being drawn by the fans 228 such that the directional flow of air applies a downwards force on the grain in the inner portion 702 of the grain column that accelerates the downward flow of grain in the inner portion, and applies an upwards force on the grain in the outer portion 704 of the grain column that retards the downward flow of grain in the outer portion. Thus, the grain in the outer portion 704 of the heating column 108 spends more time in the heated drying section 106 than the grain in the inner portion 702 of the heating column 108 to promote more even drying across the grain column in the heating column 108.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A grain dryer comprising:

a receiving area having an inlet port to receive grain entering the dryer;

a heated drying section comprising a pair of heating columns with an upper plenum in communication with the pair of heating columns, each heating column having an inner boundary and an outer boundary, the inner boundary and outer boundary of each heating column being formed with a plurality of angled containment baffles configured to funnel grain down the heating column while allowing heated air to be drawn from the upper plenum through the grain;

a heater, wherein air is heated by the heater as the air is being pulled into the upper plenum;

a ductwork connected to the outer boundary of each heating column, wherein the ductwork adjacent each heating column comprises a plurality of vertical sections arranged along a length of the grain dryer from a forward end to a rearward end of the grain dryer; and at least one fan that takes a suction from the ductwork to draw heated air from the upper plenum through the heating column such that grain entering the grain dryer through inlet port flows from the receiving area into the heating columns where the grain is exposed to heated air being pulled from the upper plenum through the heating column and into the ductwork, wherein an orientation of the containment baffles forming the inner boundary directs a flow of the heated air in a generally downward direction through an inner portion of a grain column between the inner boundary and the outer boundary, and the orientation of the containment baffles forming the outer boundary directs the heated air in a generally upwards direction in an outer portion of the grain column.

2. The grain dryer of claim 1, wherein the ductwork adjacent each heating column comprises a plurality of vertical sections arranged along a length of the grain dryer from a forward end to a rearward end of the grain dryer, wherein the containment baffles forming the inner boundary and the outer boundary are arranged side-to-side such that there are substantially continuous rows from the forward end of the grain dryer to the rearward end.

3. The grain dryer of claim 2, wherein a plurality of rows of the containment baffles are arranged in a stacked formation substantially an entire height of the heating column to continually direct the grain column in a downward manner through the heated drying section.

4. The grain dryer of claim 3, wherein the containment baffles are made of a sheet metal formed into a shape such that the containment baffles forming the inner boundary are angled in a downward and inward direction such that upper ends are closer to the upper plenum and lower ends are closer to a central portion of the heating column and the containment baffles forming the outer boundary are angled in a downward and inward direction such that upper ends are closer to the ductwork and lower ends are closer to the central portion of the heating column.

5. The grain dryer of claim 4, wherein the containment baffles are arranged such that there is a vertical overlap between an upper end of the containment baffles in a first row with the lower ends of the containment baffles in a second row above the first row.

6. The grain dryer of claim 5, wherein the containment baffles are arranged such that there is a horizontal space between the upper end of the containment baffles in one row with the lower ends of the containment baffles in the row above.

7. The grain dryer of claim 6, wherein the containment baffles direct airflow so that grain in the outer portion of the heating column spends more time in the heated drying section than the grain in the inner portion of the heating column so as to promote more even drying across a grain column in the heating column.

8. The grain dryer of claim 6, wherein the containment baffles influence a direction of airflow being drawn by the at least one fan such that the heated air applies a downwards force on the grain in the inner portion of the grain column that accelerates a downward flow of grain in the inner portion, and applies an upwards force on the grain in the outer portion of the grain column that retards the downward flow of grain in the outer portion.

9. The grain dryer of claim 1, wherein the containment baffles are arranged in row from the forward end to the rearward end of the grain dryer.

10. The grain dryer of claim 9, wherein rows are arranged such that there is a vertical overlap between an upper end of the containment baffles in a first row with a lower end of the containment baffles in a second row above the first row.

11. The grain dryer of claim 9, further comprising one grain diverter between the containment baffles of each row.

12. The grain dryer of claim 1, further comprising a plurality of grain diverters between the containment baffles.

13. The grain dryer of claim 12, where each grain diverter comprises a peaked junction located closer to a fan than a first leg and a second leg of the grain diverter.

14. The grain dryer of claim 1, wherein the at least one fan causes a vacuum within the upper plenum.

15. The grain dryer of claim 1, wherein the at least one fan causes a vacuum within a lower plenum below the upper plenum.

16. The grain dryer of claim 1, wherein the at least one fan causes a vacuum within the upper plenum and a lower plenum below the upper plenum.

* * * * *